(12) United States Patent
Wells et al.

(10) Patent No.: US 7,480,436 B2
(45) Date of Patent: Jan. 20, 2009

(54) SYSTEMS AND METHODS FOR SECURING A TETHER TO A DISTRIBUTION CABLE

(75) Inventors: Dennis Ray Wells, Richfield, MN (US); John Clifton Cobb, III, Fitchburg, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/546,528

(22) Filed: Oct. 10, 2006

(65) Prior Publication Data

US 2008/0085091 A1 Apr. 10, 2008

(51) Int. Cl.
*G02B 6/00* (2006.01)
*G02B 6/44* (2006.01)

(52) U.S. Cl. .................. 385/134; 385/100; 385/102

(58) Field of Classification Search ............ 385/100, 385/102, 109, 110, 112, 134
See application file for complete search history.

(56) References Cited

U.S. PATENT DOCUMENTS

| 2,047,152 | A | 7/1936 | Mitchell |
|---|---|---|---|
| 3,691,505 | A | 9/1972 | Graves |
| 3,845,552 | A | 11/1974 | Waltz |
| 3,879,575 | A | 4/1975 | Dobbin et al. |
| 3,912,854 | A | 10/1975 | Thompson et al. |
| 3,912,855 | A | 10/1975 | Thompson et al. |
| 4,085,286 | A | 4/1978 | Horsma et al. |
| 4,107,451 | A | 8/1978 | Smith, Jr. et al. |
| 4,152,539 | A | 5/1979 | Charlebois et al. |
| 4,322,573 | A | 3/1982 | Charlebois |
| 4,343,844 | A | 8/1982 | Thayer et al. |
| 4,405,083 | A | 9/1983 | Charlebois et al. |
| 4,413,881 | A | 11/1983 | Kovats |
| 4,467,137 | A | 8/1984 | Jonathan et al. |
| 4,475,935 | A | 10/1984 | Tanaka et al. |
| 4,481,380 | A | 11/1984 | Wood et al. |
| 4,490,315 | A | 12/1984 | Charlebois et al. |
| 4,512,628 | A | 4/1985 | Anderton |
| 4,528,150 | A | 7/1985 | Charlebois et al. |
| 4,528,419 | A | 7/1985 | Charlebois et al. |
| 4,549,039 | A | 10/1985 | Charlebois et al. |

(Continued)

FOREIGN PATENT DOCUMENTS

DE 35 37 684 A1 4/1987

(Continued)

OTHER PUBLICATIONS

Exhibit A, "Cable Assemblies: Molding & Termination," http://www.dgo.com/prodcable.htm, 8 pages (Copyright 2001).

(Continued)

*Primary Examiner*—Frank G Font
*Assistant Examiner*—Michael P Mooney
(74) *Attorney, Agent, or Firm*—Merchant & Gould P.C.

(57) ABSTRACT

A securement system includes at least one retention arrangement securing a tether to a distribution cable; and a release device secured to the distribution cable. The release device extends along at least a portion of the length of tether. Pulling the release device away from the distribution cable disengages the retention arrangement to free the tether from the distribution cable. Multiple retention arrangements can be used to secure the tether.

10 Claims, 12 Drawing Sheets

U.S. PATENT DOCUMENTS

| | | |
|---|---|---|
| 4,550,220 A | 10/1985 | Kitchens |
| 4,556,281 A | 12/1985 | Anderton |
| 4,570,032 A | 2/1986 | Charlebois et al. |
| 4,581,480 A | 4/1986 | Charlebois |
| 4,589,939 A | 5/1986 | Mohebban et al. |
| 4,591,330 A | 5/1986 | Charlebois et al. |
| 4,592,721 A | 6/1986 | Charlebois et al. |
| 4,595,256 A | 6/1986 | Guazzo |
| 4,609,773 A | 9/1986 | Brown et al. |
| 4,625,073 A | 11/1986 | Breesch et al. |
| 4,629,597 A | 12/1986 | Charlebois et al. |
| 4,648,606 A | 3/1987 | Brown et al. |
| 4,648,919 A | 3/1987 | Diaz et al. |
| 4,654,474 A | 3/1987 | Charlebois et al. |
| 4,666,537 A | 5/1987 | Dienes |
| 4,670,069 A | 6/1987 | Debbaut et al. |
| 4,670,980 A | 6/1987 | Charlebois et al. |
| 4,678,866 A | 7/1987 | Charlebois |
| 4,684,764 A | 8/1987 | Luzzi et al. |
| 4,701,574 A | 10/1987 | Shimirak et al. |
| 4,725,035 A | 2/1988 | Charlebois et al. |
| 4,732,628 A | 3/1988 | Dienes |
| 4,747,020 A | 5/1988 | Brickley et al. |
| 4,761,052 A | 8/1988 | Buekers et al. |
| 4,764,232 A | 8/1988 | Hunter |
| 4,818,824 A | 4/1989 | Dixit et al. |
| 4,822,434 A | 4/1989 | Sawaki et al. |
| 4,875,952 A | 10/1989 | Mullin et al. |
| 4,884,863 A | 12/1989 | Throckmorton |
| 4,913,512 A | 4/1990 | Anderton |
| 4,961,623 A | 10/1990 | Midkiff et al. |
| 4,963,698 A | 10/1990 | Chang et al. |
| 5,004,315 A | 4/1991 | Miyazaki |
| 5,042,901 A | 8/1991 | Merriken et al. |
| 5,046,811 A | 9/1991 | Jung et al. |
| 5,054,868 A | 10/1991 | Hoban et al. |
| 5,066,095 A | 11/1991 | Dekeyser et al. |
| 5,074,808 A | 12/1991 | Beamenderfer et al. |
| 5,097,529 A | 3/1992 | Cobb et al. |
| 5,099,088 A | 3/1992 | Usami et al. |
| 5,115,105 A | 5/1992 | Gallusser et al. |
| 5,121,458 A | 6/1992 | Nilsson et al. |
| 5,125,060 A | 6/1992 | Edmundson |
| 5,185,844 A | 2/1993 | Bensel, III et al. |
| 5,194,692 A | 3/1993 | Gallusser et al. |
| 5,210,812 A | 5/1993 | Nilsson et al. |
| 5,217,808 A | 6/1993 | Cobb |
| 5,241,611 A | 8/1993 | Gould |
| 5,245,151 A | 9/1993 | Chamberlain et al. |
| 5,335,408 A | 8/1994 | Cobb |
| 5,347,089 A | 9/1994 | Barrat et al. |
| 5,353,367 A | 10/1994 | Czosnowski et al. |
| 5,376,196 A | 12/1994 | Grajewski et al. |
| 5,378,853 A | 1/1995 | Clouet et al. |
| 5,394,502 A | 2/1995 | Caron |
| 5,402,515 A | 3/1995 | Vidacovich et al. |
| 5,410,105 A | 4/1995 | Tahara et al. |
| RE34,955 E | 5/1995 | Anton et al. |
| 5,420,958 A | 5/1995 | Henson et al. |
| 5,440,665 A | 8/1995 | Ray et al. |
| 5,442,726 A | 8/1995 | Howard et al. |
| 5,450,517 A | 9/1995 | Essert |
| 5,491,766 A | 2/1996 | Huynh et al. |
| 5,509,202 A | 4/1996 | Abdow |
| 5,517,592 A | 5/1996 | Grajewski et al. |
| 5,528,718 A | 6/1996 | Ray et al. |
| 5,657,413 A | 8/1997 | Ray et al. |
| 5,666,453 A | 9/1997 | Dannenmann |
| 5,684,911 A | 11/1997 | Burgett |
| 5,696,864 A | 12/1997 | Smith et al. |
| 5,734,776 A | 3/1998 | Puetz |
| 5,767,448 A | 6/1998 | Dong |
| 5,778,122 A | 7/1998 | Giebel et al. |
| 5,823,646 A | 10/1998 | Arizpe et al. |
| 5,825,963 A | 10/1998 | Burgett |
| 5,892,870 A | 4/1999 | Fingler et al. |
| 5,945,633 A | 8/1999 | Ott et al. |
| 5,969,294 A | 10/1999 | Eberle et al. |
| 5,997,186 A | 12/1999 | Huynh et al. |
| RE36,592 E | 2/2000 | Giebel et al. |
| 6,104,846 A | 8/2000 | Hodgson et al. |
| RE37,028 E | 1/2001 | Cooke et al. |
| 6,181,861 B1 | 1/2001 | Wenski et al. |
| 6,215,930 B1 | 4/2001 | Estes et al. |
| 6,255,584 B1 | 7/2001 | Renaud |
| 6,376,774 B1 | 4/2002 | Oh et al. |
| 6,407,338 B1 | 6/2002 | Smith |
| 6,466,725 B2 | 10/2002 | Battey et al. |
| 6,493,500 B1 | 12/2002 | Oh et al. |
| 6,539,160 B2 | 3/2003 | Battey et al. |
| 6,579,014 B2 | 6/2003 | Melton et al. |
| 6,619,697 B2 | 9/2003 | Griffioen et al. |
| 6,621,975 B2 | 9/2003 | Laporte et al. |
| 6,648,520 B2 | 11/2003 | McDonald et al. |
| 6,655,016 B2 | 12/2003 | Renaud |
| 6,668,127 B1 | 12/2003 | Mahony |
| 6,706,968 B2 | 3/2004 | Yaworski et al. |
| 6,764,220 B2 | 7/2004 | Griffiths et al. |
| 6,810,194 B2 | 10/2004 | Griffiths et al. |
| 6,819,842 B1 | 11/2004 | Vogel et al. |
| 6,856,748 B1 | 2/2005 | Elkins, II et al. |
| 6,880,219 B2 | 4/2005 | Griffioen et al. |
| 7,006,739 B2 | 2/2006 | Elkins, II et al. |
| 7,016,592 B2 | 3/2006 | Elkins, II et al. |
| 7,266,274 B2 * | 9/2007 | Elkins et al. ............... 385/100 |
| 2004/0074852 A1 | 4/2004 | Knudsen et al. |
| 2004/0228589 A1 | 11/2004 | Melton et al. |
| 2004/0247265 A1 | 12/2004 | Takano et al. |
| 2005/0053342 A1 | 3/2005 | Melton et al. |
| 2005/0069275 A1 | 3/2005 | Brants et al. |
| 2005/0111799 A1 | 5/2005 | Cooke et al. |
| 2005/0111800 A1 | 5/2005 | Cooke et al. |
| 2005/0129375 A1 | 6/2005 | Elkins, II et al. |
| 2005/0175308 A1 | 8/2005 | Elkins, II et al. |
| 2005/0259928 A1 | 11/2005 | Elkins, II et al. |
| 2005/0259929 A1 | 11/2005 | Elkins, II et al. |
| 2005/0259930 A1 | 11/2005 | Elkins, II et al. |
| 2005/0276552 A1 | 12/2005 | Cooke et al. |
| 2006/0056782 A1 | 3/2006 | Elkins, II et al. |

FOREIGN PATENT DOCUMENTS

| | | |
|---|---|---|
| EP | 0 115 725 A1 | 8/1984 |
| EP | 1 361 465 A1 | 11/2003 |
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-54204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 2001-116968 | 4/2001 |
| WO | WO 2005/119322 A1 | 12/2005 |
| WO | WO 2006/044080 A1 | 4/2006 |
| WO | WO 2006/060250 A2 | 6/2006 |

WO    WO 2006/071412 A1    7/2006

OTHER PUBLICATIONS

Exhibit B, "DAM/BLOK™ Electrical Splice Kit," http://www.pmiind.com/products/damblok.html, 2 pages (Copyright 2000).
Exhibit C, "Factory Installed Termination System for Fiber Optic Cable Splices," 1 page (admitted as prior art as Oct. 10, 2006).
Exhibit D, "Installation Instructions for Pre-Connectorized MIC® Cable (2-6 Fiber) Equipped with Plug & Play™ Systems Pulling Grips," *Corning Cable Systems*, Issue 7, pp. 1-3 (Jul. 2001).
Exhibit E, "Pre-Connectorized (4-24 Fiber) Fiber Optic Cables Equipped with Plug & Play™ Systems Pulling Sleeves and Grips," *Corning Cable Systems*, Issue 1, pp. 1-7 (Mar. 2005).
International Search Report and Written Opinion mailed Mar. 17, 2008.

* cited by examiner

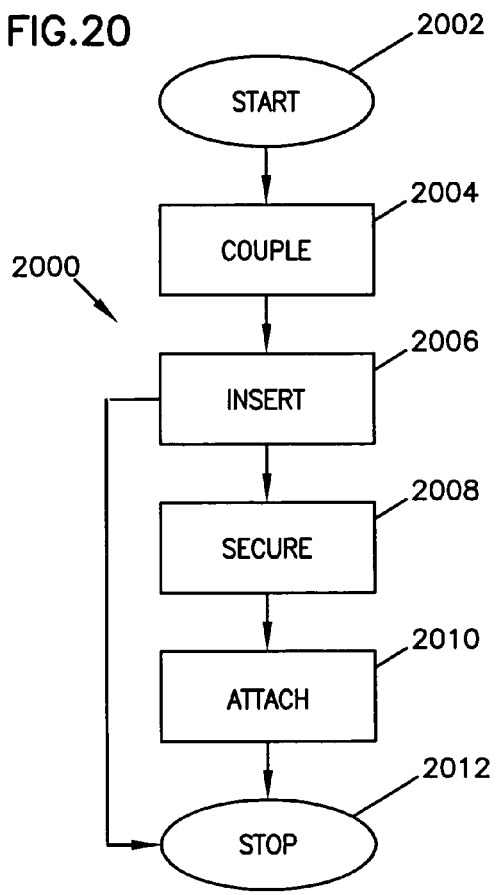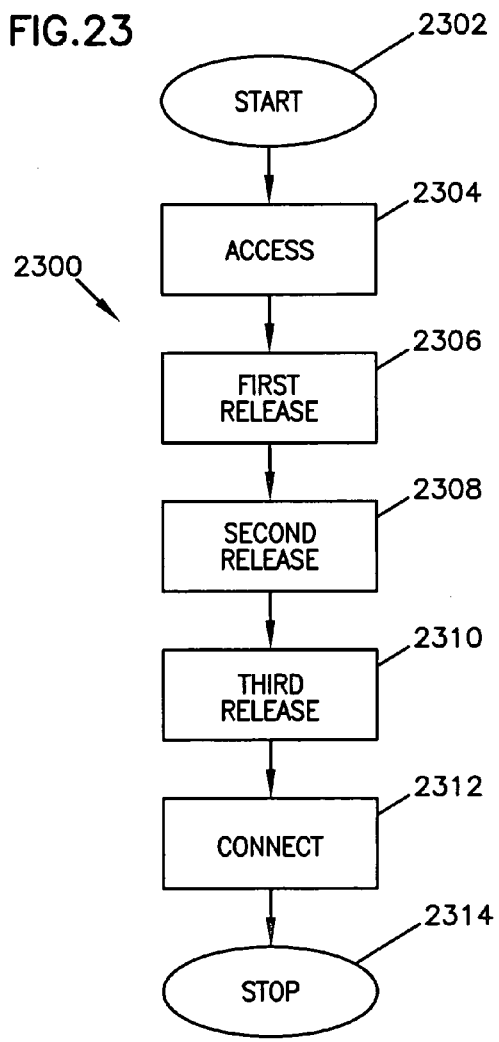

SYSTEMS AND METHODS FOR SECURING A TETHER TO A DISTRIBUTION CABLE

TECHNICAL FIELD

The principles disclosed herein relate to fiber optic cable systems. More particularly, the present disclosure relates to fiber optic cable systems having main cables and branch cables.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown in FIG. 1, the network 100 may include a central office 110 that connects a number of end subscribers 115 (also called end users 115 herein) in a network. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits (e.g., see conduit 105).

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations may include fewer or more fibers. The portion of network 100 that includes an FDH 130 and a number of end users 115 may be referred to as an F2 portion of network 100. Splitters used in an FDH 130 may accept a feeder cable having a number of fibers and may split those incoming fibers into, for example, 216 to 432 individual distribution fibers that may be associated with a like number of end user locations.

Referring to FIG. 1, the network 100 includes a plurality of breakout locations 125 at which branch cables (e.g., drop cables, stub cables, etc.) are separated out from main cables (e.g., distribution cables). Breakout locations can also be referred to as tap locations or branch locations and branch cables can also be referred to as breakout cables. At a breakout location, fibers of the branch cables are typically spliced to selected fibers of the main cable. However, for certain applications, the interface between the fibers of the main cable and the fibers of the branch cables can be connectorized.

Stub cables are typically branch cables that are routed from breakout locations to intermediate access locations such as a pedestals, drop terminals or hubs. Intermediate access locations can provide connector interfaces located between breakout locations and subscriber locations. A drop cable is a cable that typically forms the last leg to a subscriber location. For example, drop cables are routed from intermediate access locations to subscriber locations. Drop cables can also be routed directly from breakout locations to subscriber locations thereby bypassing any intermediate access locations Branch cables can be manually separated out from a main cable in the field using field splices. Field splices are typically housed within sealed splice enclosures. Manual splicing in the field can be time consuming and expensive.

As an alternative to manual splicing in the field, pre-terminated cable systems have been developed. Pre-terminated cable systems include factory integrated breakout locations manufactured at predetermined positions along the length of a main cable (e.g., see U.S. Pat. Nos. 4,961,623; 5,125,060; and 5,210,812). However, the installation of pre-terminated cables can be difficult. For example, for underground applications, pre-terminations can complicate passing pre-terminated cable through the underground conduit typically used to hold fiber optic cable (e.g., 1.25 inch inner diameter conduit). Locating and accessing pre-terminated breakouts can be difficult in underground applications. Similarly, for aerial applications, pre-terminations can complicate passing pre-terminated cable through aerial cable retention loops.

SUMMARY

Certain aspects of the disclosure relate to fiber optic cable systems, packaging configurations and methods that facilitate the effective use and installation of pre-terminated fiber optic cable.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 20 is a flowchart showing a process for implementing the third secure operation of FIG. 13;

FIG. 23 is a flowchart showing a process for releasing the tether cable from the second securement system of FIG. 13.

DETAILED DESCRIPTION

The present disclosure relates to fiber optic cable systems. In particular, the present disclosure relates to a pre-terminated fiber optic cable system for releasably securing a tether to a distribution cable beyond a breakout location.

Figure 2:
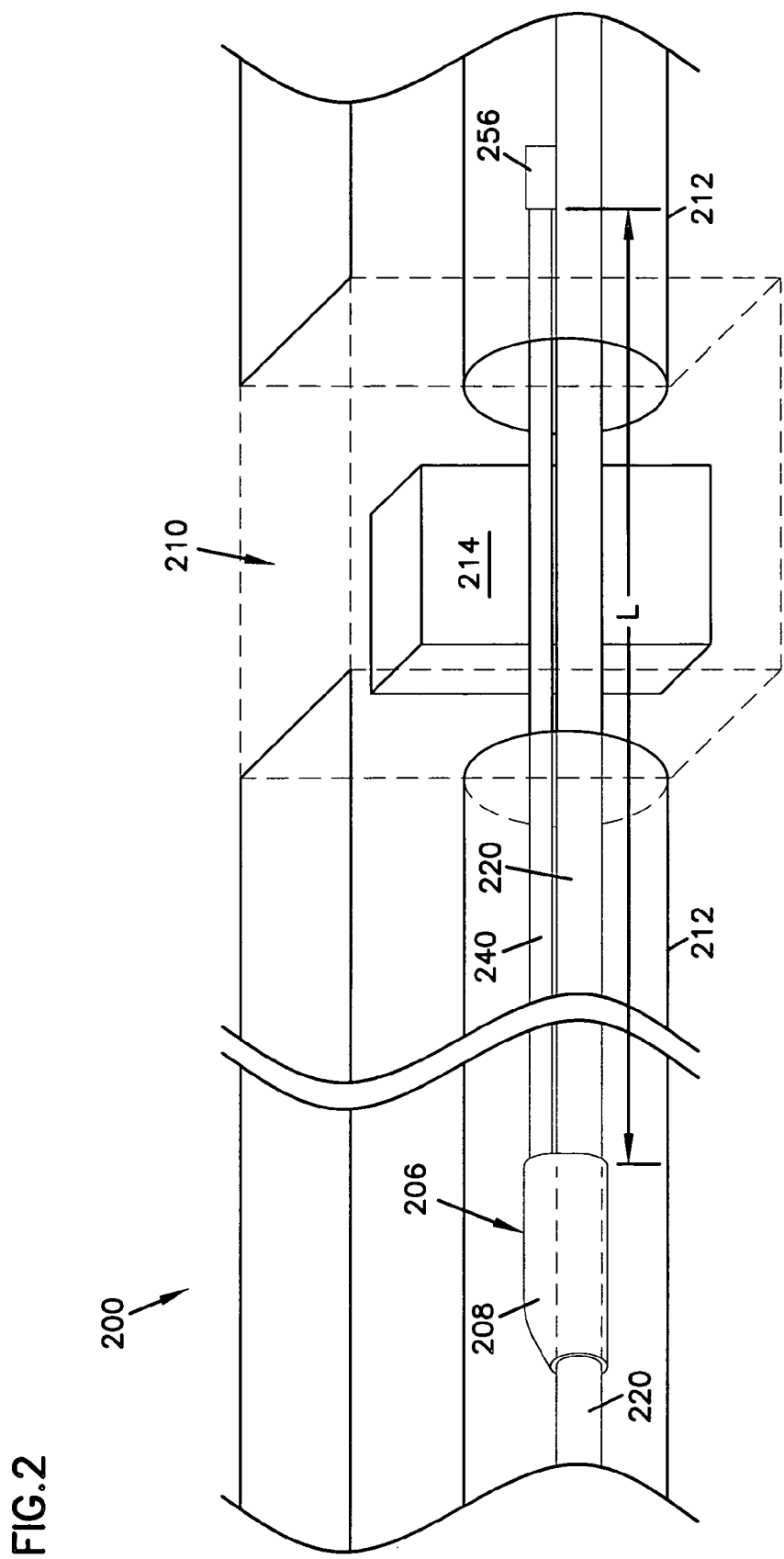
FIG. 2 is a perspective view of a cable system installed underground and accessed via a hand-hole location.

FIG. 2 illustrates a cable system 200 including the main cable (e.g., a distribution cable) 220 and a branch cable (e.g., tether) 240 that separates (i.e., branches out) from the main cable 220 at a breakout location 206. The breakout location 206 is protected and sealed by a structure, such as an enclosure 208. The tether cable 240 extends outwardly from the enclosure 208 along a length L and terminates at one or more connectors 256. The connectors 256 are configured to optically couple to a drop terminal 214 or other piece of telecommunications equipment at a hand-hole location 210.

Figure 3:
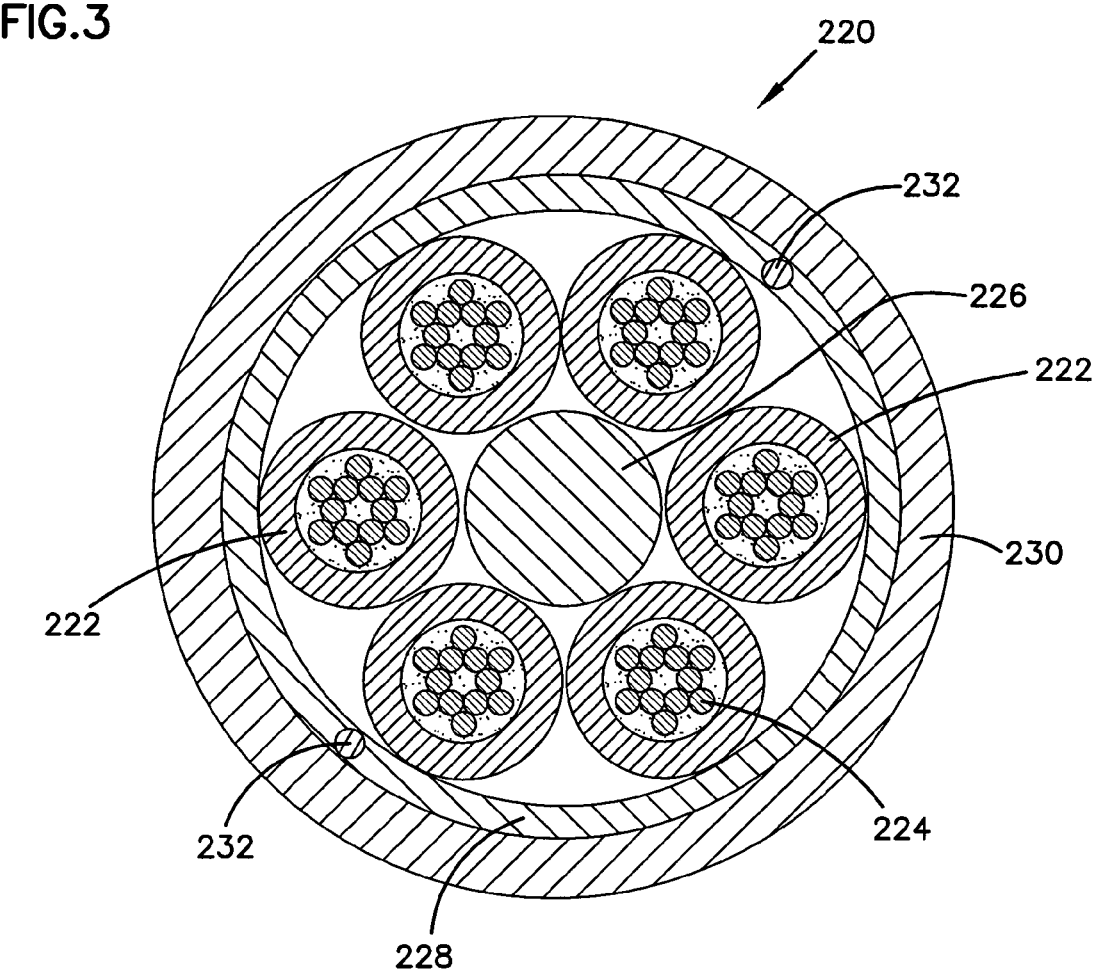
FIG. 3 is a cross-sectional view of a distribution cable according to one embodiment of the present disclosure.

A typical breakout location is provided at an intermediate point along a length of a distribution cable. For example, the distribution cable 220 can include six separate buffer tubes 222 each containing multiple (e.g., twelve) fibers 224 (see FIG. 3). The buffer tubes 222 may be gel filled. The fibers 224 within each buffer tube 222 can include either ribbon fibers or loose fibers. The distribution cable 220 can also include a central strength member 226 for reinforcing the cable 220, and an outer strength layer/member 228 such as aramid fiber/yarn (e.g., Kevlar®) also for reinforcing the cable (see FIG. 3). The distribution cable 220 further includes an outer jacket 230 that encloses the buffer tubes 222 (see FIG. 3). Ripcords 232 can be provided for facilitating tearing away portions of the jacket 230 to access the fibers 224 within the jacket 230 (see FIG. 3).

While distribution cables 220 typically have a large number of fibers, the various aspects of the present disclosure are also applicable to distribution cables 220 having fewer numbers of fibers (e.g., 2 or more fibers). For example, the distribution cable 220 can include an outer jacket enclosing a single buffer tube and at least two strength members extending on opposite sides of the single buffer tube. An outer strength member, such as aramid fiber/yarn, can surround the single buffer tube within the jacket. The single buffer tube can enclose loose fibers or ribbon fibers.

Figure 4:
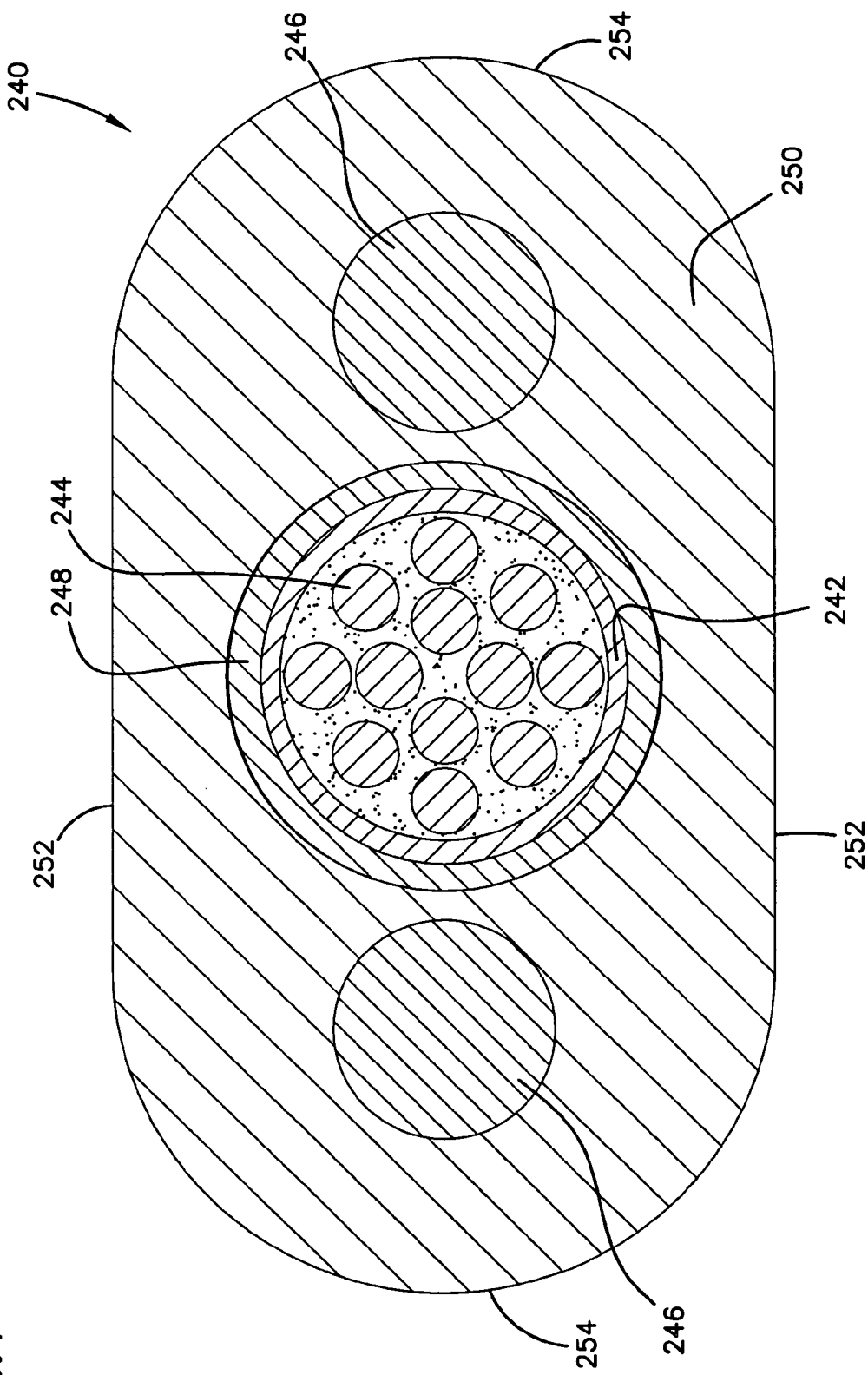
FIG. 4 is a cross-sectional view of a tether according to one embodiment of the present disclosure.

The tether (e.g., a drop cable or a stub cable) 240 most commonly has a fewer number of fibers as compared to the number of fibers provided within the distribution cable 220. FIG. 4 illustrates a tether cable 240 configured to join to the distribution cable 220 at the breakout location 206. The tether 240 is depicted as having a flat cable configuration. The flat cable configuration includes a central buffer tube 242 containing fibers 244 (e.g., typically one to twelve loose or ribbonized fibers). Strength members 246 (e.g., flexible rods formed by glass fiber reinforced epoxy) are positioned on opposite sides of the central buffer tube 242. An outer jacket 250 surrounds the strength members 246 and the buffer tube 242.

The outer jacket 250 includes an outer perimeter having an elongated transverse cross-sectional shape. An additional strength layer 248 (e.g., aramid yarn, such as Kevlar®) can be positioned between the buffer tube 242 and the outer jacket 250. As shown at FIG. 4, the transverse cross-sectional shape includes oppositely positioned, generally parallel sides 252 interconnected by rounded ends 254. However, any suitable cable configuration can be utilized for both the distribution cable and the tether cable.

The tether 240 includes fibers that extend between first and second ends. The first ends of the tether fibers 244 are preferably spliced to selected fibers 224 of the distribution cable 220 at the breakout location 206 (see FIG. 2). The second ends of the tether fibers 244 are configured to optically couple to the telecommunications equipment 214 at the hand-hole location 210 (see FIG. 2). The second ends can either be connectorized or unconnectorized.

Figure 5:
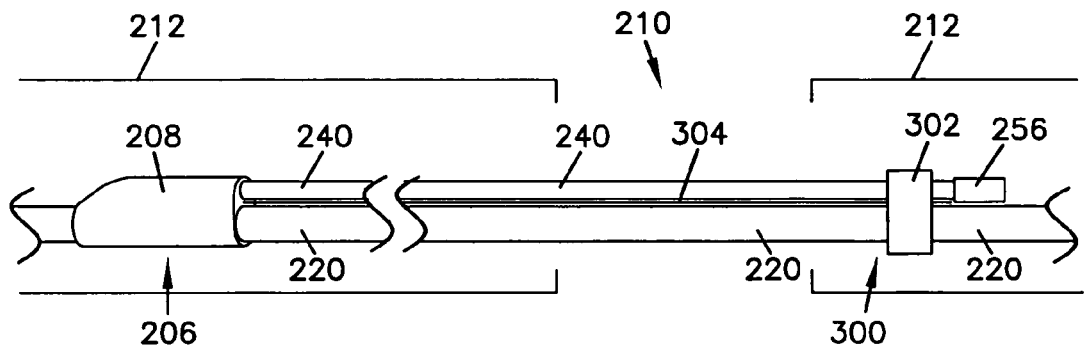
FIG. 5 is a schematic view of the cable system of FIG. 2 including a securement system for fastening the length of tether to the distribution cable according to one embodiment of the present disclosure.

Referring now to FIG. 5, in general, the cable system 200 is installed within underground conduits 212 by pulling the main cable 220 through the conduits 212. Typically, the cable 220 is pulled in a direction such that the connectors 256 of the tether 240 trail the enclosure 208. In other embodiments, the cable 220 can be pulled in the opposite direction. The distribution cable 220 is arranged within the conduits 212 such that a portion of each tether 240 branching from the cable 220 is accessible from a hand-hole location 210.

In some embodiments, the distribution cable 220 is arranged such that the connectors 256 of the tether 240 are offset from the hand-hole location 210 in one direction and the enclosure 208 is offset from the hand-hole location 210 in an opposite direction. In such embodiments, the enclosure 208 is located within a conduit 212 and is not accessible by a technician. In other embodiments, the distribution cable 220 is arranged such that the connectors 256 of a tether 240 are substantially aligned with the hand-hole location 210. In still other embodiments, the distribution cable 220 is arranged such that the enclosure 208 is substantially aligned with the hand-hole 210.

After being optically coupled to the distribution cable at one end, the remainder of the tether 240 can be secured along a length to the distribution cable 220. In certain embodiments, the tether 240 can be secured to the distribution cable 220 along the entire length L of the tether 240. In other embodiments, only the far end (e.g., the connectorized end) of the tether 240 is secured. Securing the tether 240 mitigates the chances of damaging the tether 240 and tether connectors 256 during installation of the distribution cable 220.

FIG. 5 illustrates a securing system 300 for fastening the tether 240 to the distribution cable 220. The securement system 300 includes a retention structure 302 configured to secure the tether 240 to the distribution cable 220. In the example shown, the retention arrangement 302 secures the tether 240 to the distribution cable 220 adjacent the tether connectors 256. In other embodiments, however, the retention arrangement 302 can secure the tether 240 to the distribution cable 220 along any portion of the tether 240. Multiple retention arrangements can also be used to secure the tether 240.

The securement system 300 also includes a release device 304 extending along the distribution cable 220 and the length L (FIG. 2) of the tether cable 240. As shown at FIG. 5, the release device 304 extends generally from the tether connectors 256 to the breakout location 206. Typically, the release device 304 is positioned to enable at least a portion of the release device to be accessible by a user from the hand-hole location 210.

In use, a user can access the securement system 300 through the hand-hole location 210. To separate the tether cable 240 from the distribution cable 220, the user grasps the release device 304 and pulls. Pulling the release device 304 disengages the retention arrangement 302, thereby freeing the tether 240. For example, in some embodiments, pulling the release device 304 can break or tear the retention arrangement 302. In other embodiments, however, pulling the release device 304 unbinds the retention arrangement 302 without breaking the retention arrangement 302.

Figure 6:
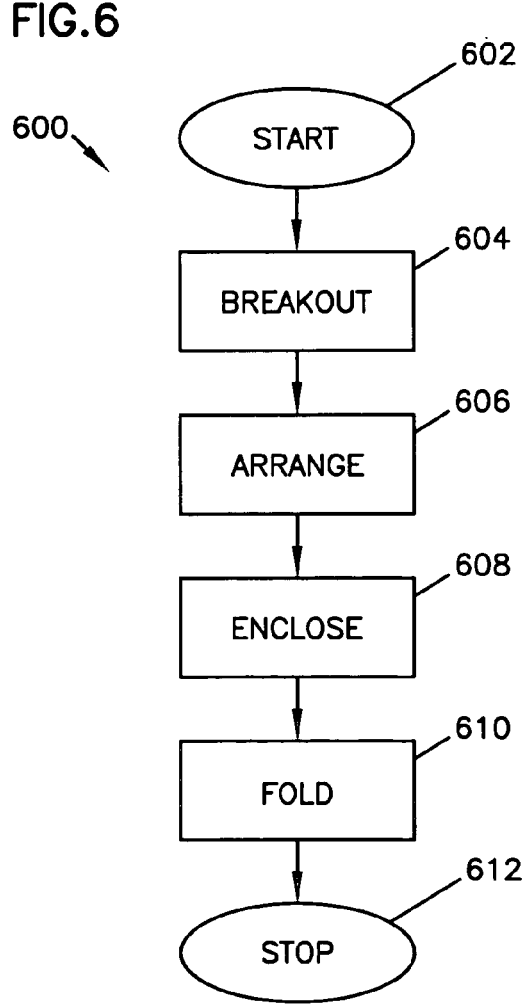
FIG. 6 is a flowchart showing a process for securing a tether to a distribution cable using a first example securement system according to one embodiment of the present disclosure.
Figure 7:
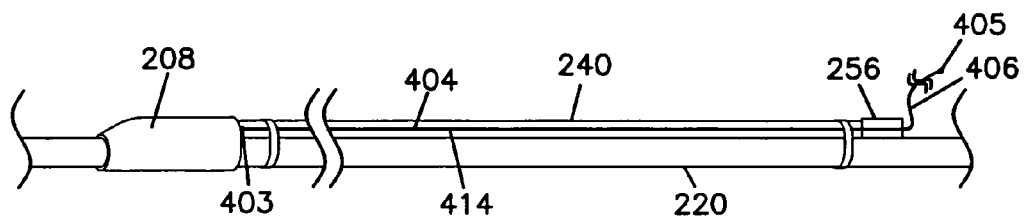
FIGS. 7-9 are side perspective views of a cable system in different stages of the securing process depicted in FIG. 6.
Figure 8:
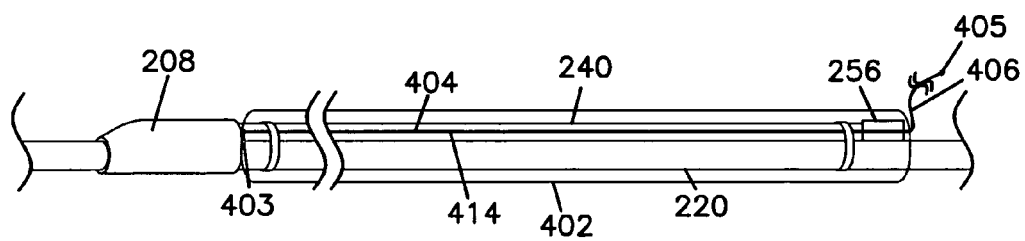
Figure 9:
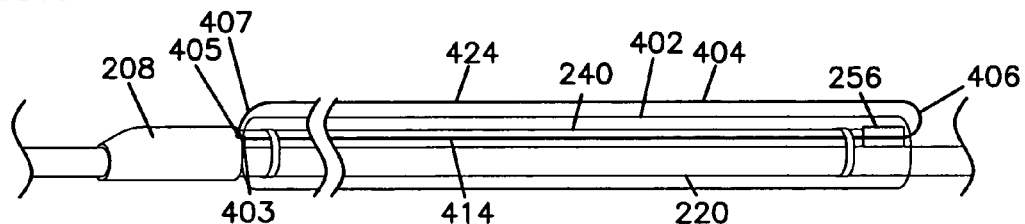

Referring now to FIGS. 6-20, the principles of the present disclosure can best be understood through some example applications. As shown in FIGS. 6-11, a tether cable 240 can be releasably secured to a distribution cable 220 using a first securement system 400 having feature that are examples of inventive aspects in accordance with the principles of the present disclosure. FIG. 6 depicts an operation flow for a process 600 by which a tether 240 can be releasably secured to a distribution cable 220 using the first securement system 400. FIGS. 7-9 illustrate the results of the operations of the securing process 600.

The securing process 600 begins at start module 602 and proceeds to breakout operation 604. The breakout operation 604 attaches a tether to a distribution cable at a breakout location. Typically, the breakout operation 604 includes splicing the tether to the distribution cable and providing a protective enclosure around the splice. Further details regarding embodiments of the breakout operation 604 can be found in U.S. Ser. No. 60/781,280, filed Mar. 9, 2006, and entitled "FIBER OPTIC CABLE BREAKOUT CONFIGURATION"; U.S. Ser. No. 60/781,622, filed Mar. 9, 2006, and entitled "MID-SPAN BREAK-OUT WITH HELICAL FIBER ROUTING"; and U.S. Ser. No. 60/781,621, filed Mar. 9, 2006, and entitled "MID-SPAN BREAK OUT WITH POTTED CLOSURE," the disclosures of which are hereby incorporated by reference.

The process 600 proceeds to arrange operation 606. The arrange operation 606 provides a wire or other type of release device (e.g., aramid fiber/yarn, etc.) having a length generally twice the length L of the tether cable. The arrange operation 606 lays a first portion of the wire along the tether from the enclosure to the tether connectors. Typically, the first portion of wire is about half the overall length of the wire. The results of arrange operation 606 are shown in FIG. 7.

FIG. 7 illustrates a tether 240 extending outwardly from an enclosure 208 along a distribution cable 220. The tether 240 terminates at one or more connectors 256 a distance from the enclosure 208. A first length 414 of wire 404 extends along the distribution cable 220 adjacent the tether cable 240. A first end 403 of the wire 404 is secured (e.g., taped) to the distribution cable 220 adjacent the enclosure 208. An intermediate end 406 of the wire 404 is secured to the distribution cable 220 adjacent the tether connectors 256. The wire 404 can be secured around the cables 220, 240 using tape, adhesive, or other such means.

In other embodiments, the first securement system 400 can include wire 404 routed in the opposite direction such that the ends 403, 405 of the wire 404 are secured adjacent the tether connectors 256 and the intermediate end 406 of the wire 404 is secured adjacent the breakout enclosure 208.

Continuing with process 600, an enclose operation 608 wraps foil or another type of material (e.g., tape, plastic wrap, etc.) around the distribution cable, the tether cable, and the first length of wire. In a preferred embodiment, the enclosure operation 608 wraps foil from the enclosure to the tether connectors. The results of the enclose operation 608 are shown in FIG. 8. Foil 402 is wrapped around the distribution cable 220, the first length 414 of wire 404, and the tether 240. The foil 402 can be secured around the cables 220, 240 and wire 404 using tape, adhesive, or other such means.

A fold (i.e., loop-back) operation 610 routes the remaining wire from the tether connectors back to the enclosure. Fold operation 610 lays the second length of wire, from the intermediate end to a second end of wire over the foil. In some embodiments, the second end of the wire is taped to the foil adjacent the enclosure. In other embodiments, the second end of the wire is secured to the distribution cable. The results of operation 610 are shown in FIG. 9.

FIG. 9 illustrates a second length 424 of wire 404 lain over the foil 402. The foil 402 encloses the first length 414 of wire 404, the distribution cable 220, and the tether 240. In the example shown, a second end 405 of the wire 404 is secured to the distribution cable 220 adjacent the enclosure 208. In other embodiments, however, the second end 405 can be secured at any desired point along the length of the distribution cable 220. In some embodiments, the second length 424 of the wire 404 is configured to be manipulated by a user. In other embodiments, the second end 405 is configured to be grasped. In one such embodiment, the second end 405 includes a ring 407 suitable for grasping with pliers or other such tools. In another embodiment, the second end 405 is configured to be grasped by hand. The process 600 ends at stop module 612.

Figure 10:
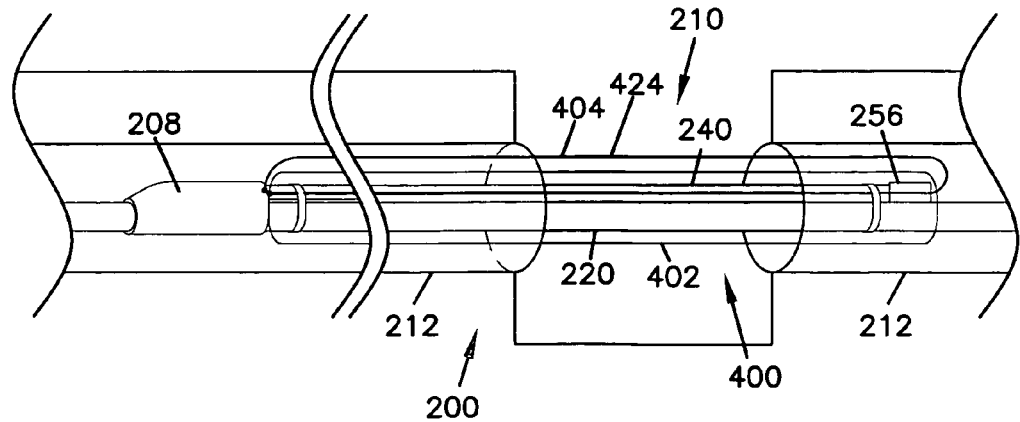
FIG. 10 is a side perspective view of the cable system and first securement system of FIG. 9 deployed in an underground conduit according to one embodiment of the present disclosure.
Figure 11:
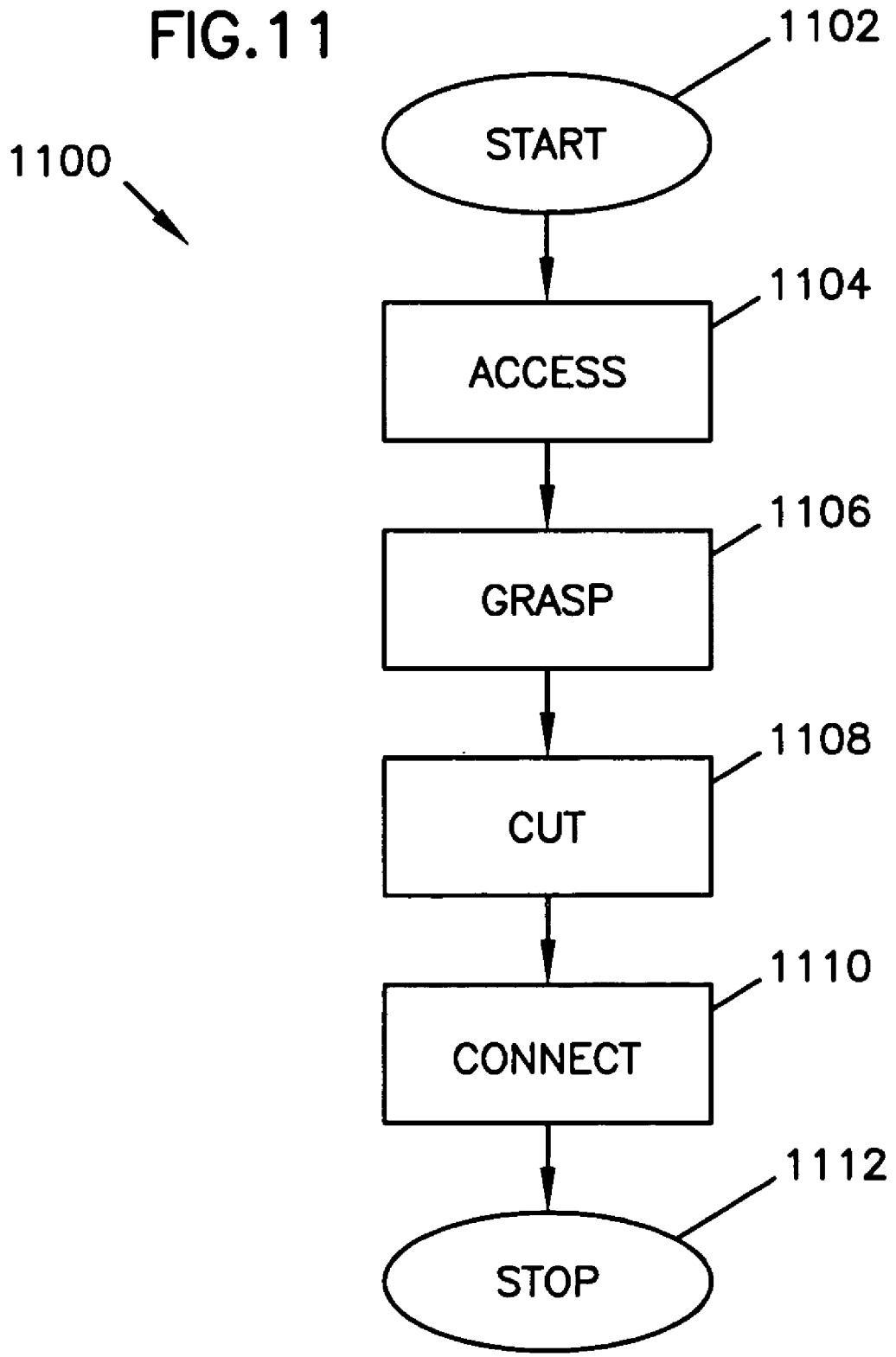
FIG. 11 is a flowchart showing a process for releasing the tether from the first securement system of FIG. 10 according to one embodiment of the present disclosure.
Figure 12:
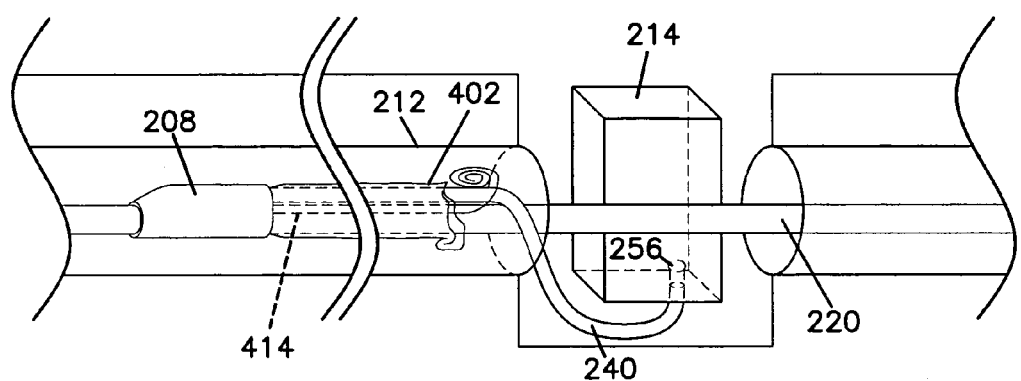
FIG. 12 is a schematic view of the cable system of FIG. 10 released from a securement system and optically coupled to telecommunications equipment at a hand-hole location according to one embodiment of the present disclosure.

Referring to FIGS. 10-12, the tether 240 can be released from the distribution cable 220 after deployment (i.e., payout) of the distribution cable 220. FIG. 10 illustrates the cable system 200 including the first securement system 400 installed in an underground conduit 212. The second length 424 of the wire 404 of the first securement system 400 is accessible from a hand-hole location 210. FIG. 11 shows an operation flow for a process 1100 by which the tether 240 can be released from the first securement system 400. FIG. 12 illustrates the cable system 200 after the tether 240 has been released from the distribution cable 220 and coupled to the telecommunications equipment 214 at the hand-hole location 210.

Figure 1:
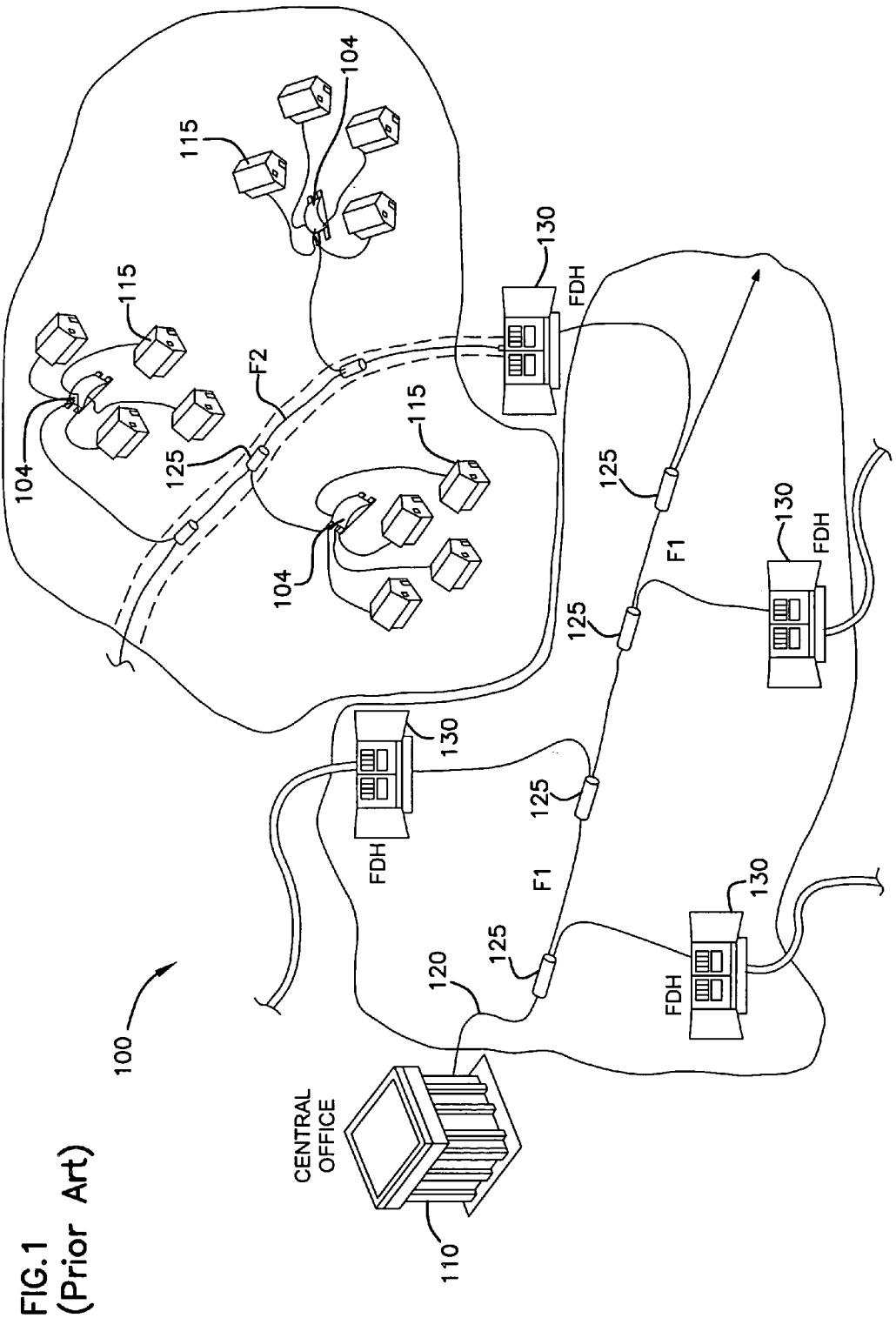
FIG. 1 shows a prior art passive fiber optic network.

As shown in FIG. 1, the process 1100 begins at start module 1102 and proceeds to an access operation 1104. Access operation 1104 opens a hand-hole location to enable a user, such as a field technician, to view a tether and a distribution cable. In the example shown in FIG. 10, the user can view a portion of the tether 240 intermediate the enclosure 208 and the tether connectors 256 through the hand-hole location 210. In other embodiments, however, the user can view the enclosure 208 or the connectors 256 of the tether cable 240 through the hand-hole location 210.

In some embodiments, the process 1100 proceeds to a grasp operation 1106, in which a user takes hold of the second length of wire. For example, in one embodiment of the grasp operation 1106, a user can cut tape wrapped around the second end 405 of the wire 404 to expose a ring 407. In other embodiments, however, the process 1100 proceeds from the access operation 1104 to a cut operation 1108.

The cut operation 1108 pulls the second length of wire in a direction away from the distribution cable. In a preferred embodiment, the cut operation 1108 pulls the second length of wire away from the distribution cable and the tether connectors. Pulling the second length of wire causes the intermediate end of the wire to begin cutting the foil securing the tether to the distribution cable. The tether connectors are released from the foil by tearing at least a portion of the foil adjacent the connectors with the intermediate end of the wire. In some embodiments, the cut operation 1108 pulls the wire sufficient to tear the foil from the tether connectors to the hand-hole location. In other embodiments, however, the cut operation 1108 pulls the wire sufficient to tear the foil from the tether connectors to the enclosure.

A connect operation 1110 obtains a sufficient segment of freed tether to optically couple the tether to the telecommunications equipment at the hand-hole location. Results of the connect operation 1110 are shown in FIG. 12. A portion of the tether 240 has been released from the distribution cable 220. In the example shown, the tether 240 extends through an aperture in the bottom of the telecommunications equipment 214. In other embodiments, however, any desired optical coupling between the tether 240 and the telecommunications equipment 214 can be achieved. The process 1100 ends at stop module 1112.

Referring now to FIGS. 13-18, a tether 240 can be secured to a distribution cable 220 using a second securement system 500 having feature that are examples of inventive aspects in accordance with the principles of the present disclosure. The second securement system 500 includes any combination of a first retention arrangement, a second retention arrangement, and a third retention arrangement.

Figure 13:
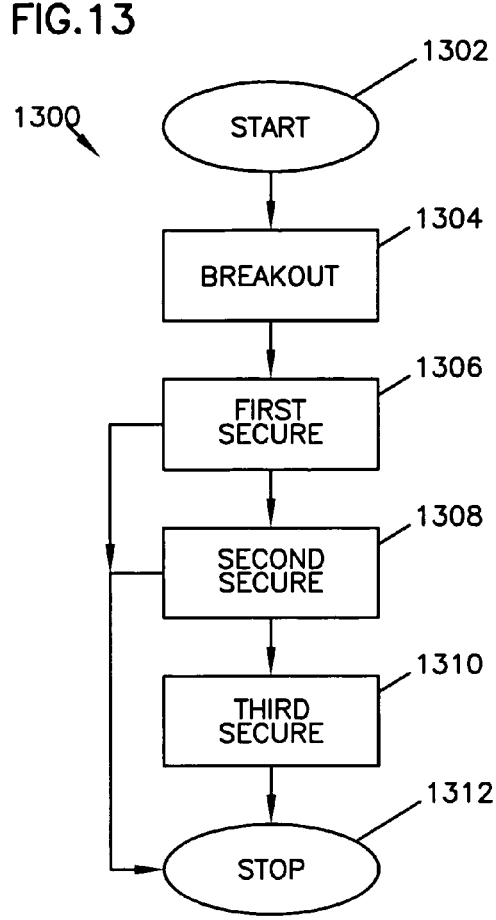
FIG. 13 is a flowchart showing a process for securing a tether to a distribution cable using a second securement system.

FIG. 13 depicts an operation flow for a coupling process 1300 by which a tether can be releasably secured to a distribution cable using the second securement system. The coupling process 1300 begins at start module 1302 and proceeds to a breakout operation 1304. The breakout operation 1304 attaches a tether to a distribution cable at a breakout location similar to breakout operation 604 of process 600.

Figure 14:
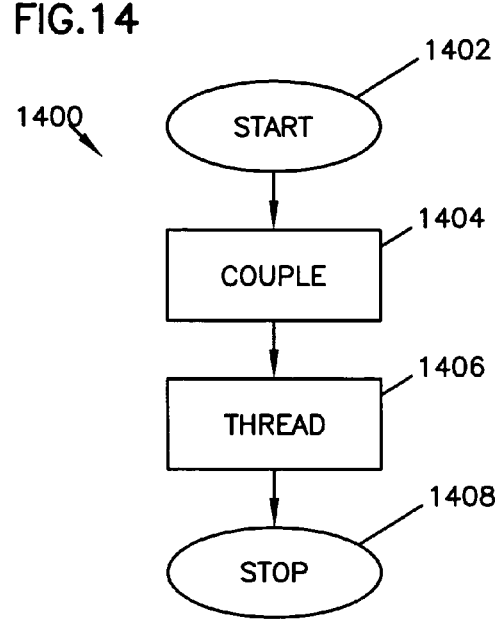
FIG. 14 is a flowchart showing a process for implementing the first secure operation of FIG. 13.
Figure 15:
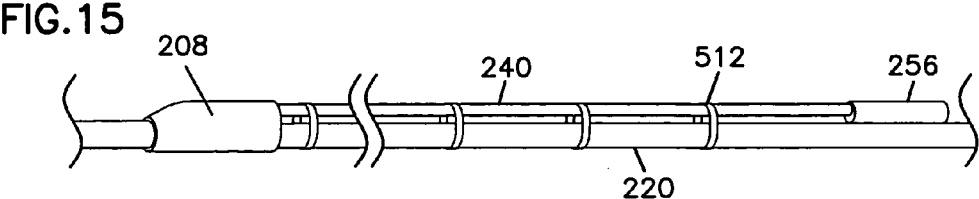
FIGS. 15-16 are perspective views of a cable system in different stages of the securing process depicted in FIG. 14.
Figure 16:
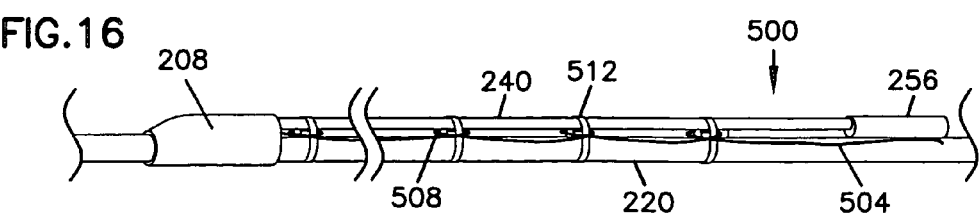

A first secure operation 1306 couples at least the tether connectors 256 to the distribution cable using a first retention arrangement. In general, the first retention device is configured to disengage the tether from the distribution cable using a first release device. For example, FIG. 14 illustrates one operational flow for a process 1400 for implementing the first secure operation 1306 of FIG. 13. FIGS. 15 and 16 illustrate the results of the operations of process 1400.

The process 1400 begins at start module 1402 and proceeds to a couple operation 1404. The couple operation 1404 joins at least the tether connectors to the distribution cable using a first retention arrangement. For example, as shown in FIG. 15, the couple operation 1404 can wrap vinyl tape 512 around the distribution cable 220 and the tether 240. In a preferred embodiment, the tape 512 is looped around the distribution cable 220 and tether 240 at spaced intervals (e.g., about every twelve inches) between the enclosure 208 and the tether connectors 256. In other embodiments, a single piece of tape 512 wrapped adjacent the tether connectors 256 can suffice.

A thread operation 1406 engages a first release device with the first retention arrangement. In a preferred embodiment, a flexible strand is looped around the first retention arrangement (e.g., see FIG. 16 at loops 508). For example, as shown in FIG. 16, a strand of aramid fiber/yarn (e.g., Kevlar® or other tough, but flexible material) 504 can be sequentially looped around the tape 512. The process 1400 ends at stop module 1408.

Figure 17:
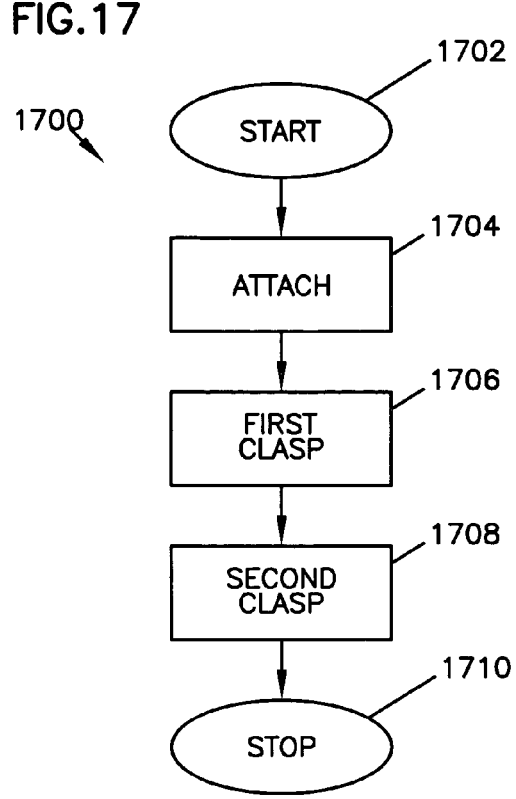
FIG. 17 is a flowchart showing a process for implementing the second secure operation of FIG. 13.
Figure 18:
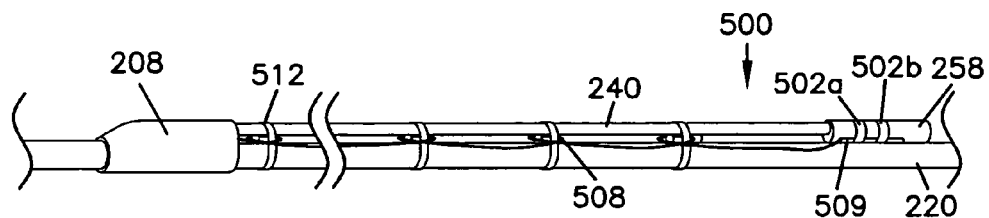
FIGS. 18-19 are perspective views of a cable system in different stages of the securing process depicted in FIG. 17.
Figure 19:
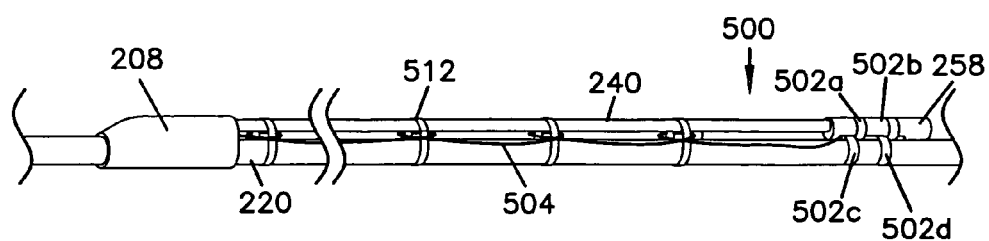

Referring back to FIG. 13, the process 1300 can end at stop module 1312 or can proceeds to a second secure operation 1308. The second secure operation 1308 couples the tether to the distribution cable using a second retention device. FIG. 17 illustrates an operational flow for one process 1700 by which the second secure operation 1308 of FIG. 13 can be implemented. FIGS. 18 and 19 illustrate the results of the operations of process 1700.

The process 1700 begins at start module 1702 and proceeds to a couple operation 1704. The couple operation 1704 joins a second release device to one end of a flexible strand of material. In a preferred embodiment, the couple operation 1704 joins the second release device to the first release device (e.g., the aramid fiber/yarn). For example, as shown in FIG. 18, the couple operation 1704 can join a pin 509 to the flexible strand 504 wrapped around the first retention arrangement 512. In a preferred embodiment, the pin 509 is formed from a bent steel rod. In other embodiments, however, the couple operation 1704 can join the second release device to a flexible strand other than the first release device.

A first clasp operation 1706 secures the second release device either to the tether or to a body of the tether connectors using a second retention arrangement. For example, as shown in FIG. 18, two tie-wraps 502a, 502b or other loop structure can hold the pin 509 to a connector body 258 of the tether 240. In other embodiments, greater or fewer tie-wraps 502 can be used.

A second clasp operation 1708 secures the second release device to the distribution cable using the second retention arrangement. The tether is thus secured to the distribution cable. For example, as shown in FIG. 19, the pin 509 can be held to the distribution cable 220 using a third tie-wrap 502c and a fourth tie-wrap 502d. Tape 510 (FIG. 21) or another retention device can further secure one or both ends of the pin 509 to the distribution cable 220. The process 1700 ends at stop module 1710.

Figure 21:
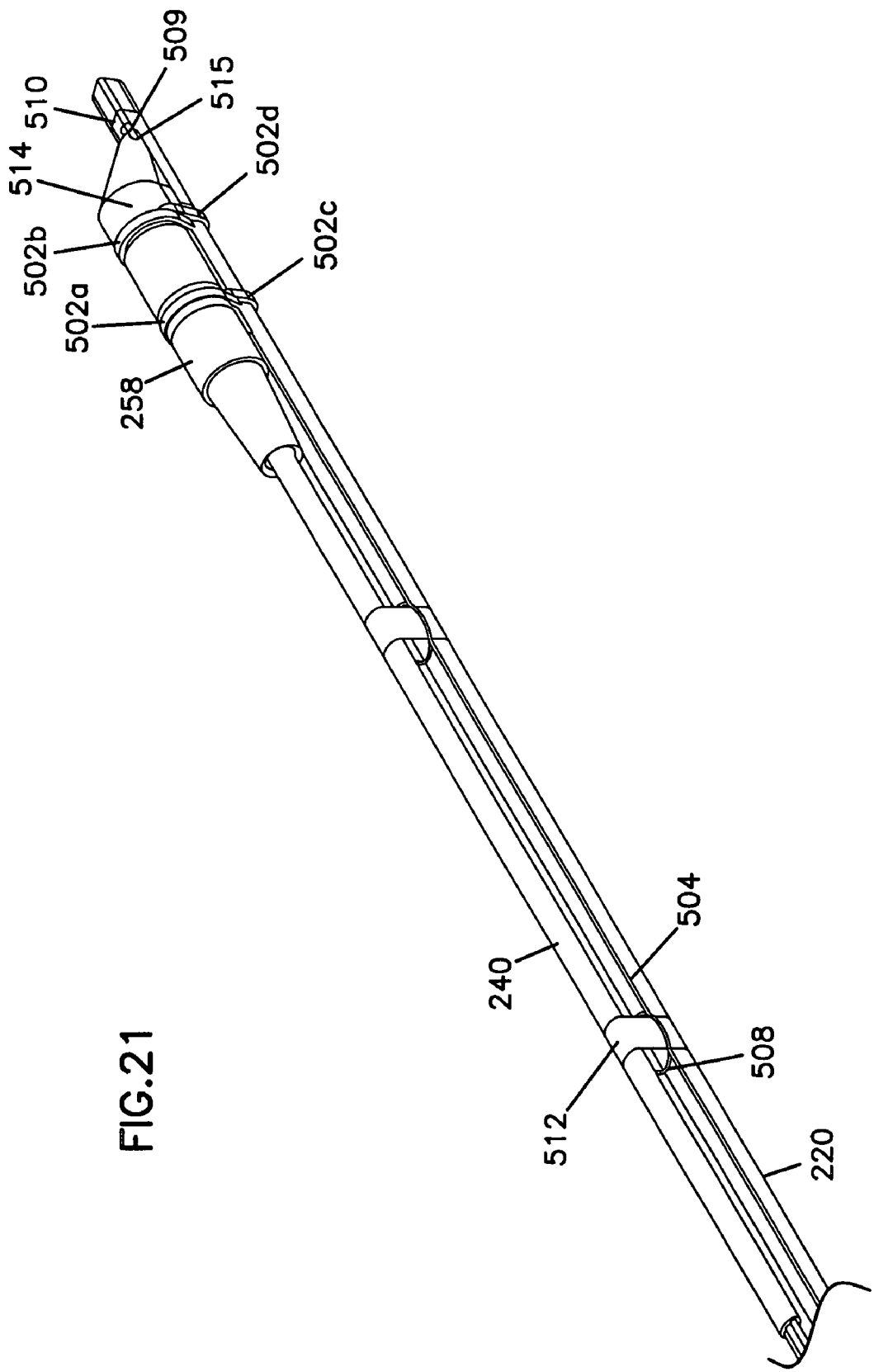
FIG. 21 is a perspective view of a cable system including the first, second, and third retention arrangements and the first and second release devices.

Referring back to FIG. 13, the process 1300 can end at stop module 1312 after the second secure operation 1308 or can proceed to a third secure operation 1310. The third secure operation 1310 couples the tether to the distribution cable using a third retention device. FIG. 20 illustrates an operational flow for one process 2000 by which the third secure operation 1310 of FIG. 13 can be implemented. FIG. 21 illustrates the results of the operations of process 2000.

The process 2000 begins at start module 2002 and proceeds to a couple operation 2004. The couple operation 2004 secures a third retention arrangement to the distribution cable. For example, as shown in FIG. 21, the couple operation 2004 can secure a nose cone 514 to the distribution cable 220. In a preferred embodiment, the nose cone 514 is secured at a fixed position with respect to the distribution cable 220.

An insert operation 2006 couples the third retention arrangement to the tether or to the tether connector body. For example, as shown in FIG. 21, the nose-cone 514 can be configured to receive at least a portion of the body 258 of the tether connectors 256. In a preferred embodiment, the insert operation 2006 slides the body 258 of the tether connectors 256 into the nose-cone 514.

In some embodiments, the process 2000 can end at stop module 2012 after the insert operation 2006. In other embodiments, however, a secure operation 2008 engages the second release device with the third retention arrangement. For example, in a preferred embodiment, the thread operation 2008 inserts the pin 509 through a hole 515 in a side of the nose cone 514.

An attach operation 2010 further secures the second release device either to the distribution cable or to the third retention arrangement. For example, as shown in FIG. 21, a protruding portion of the pin 509 can be fastened to the distribution cable 220 with tape 510 after being fed through the aperture 515 in the nose cone 514. In other embodiments, the protruding portion of the pin 509 can be taped to the nose cone 514. The process 2000 ends at stop module 2012.

Figure 22:
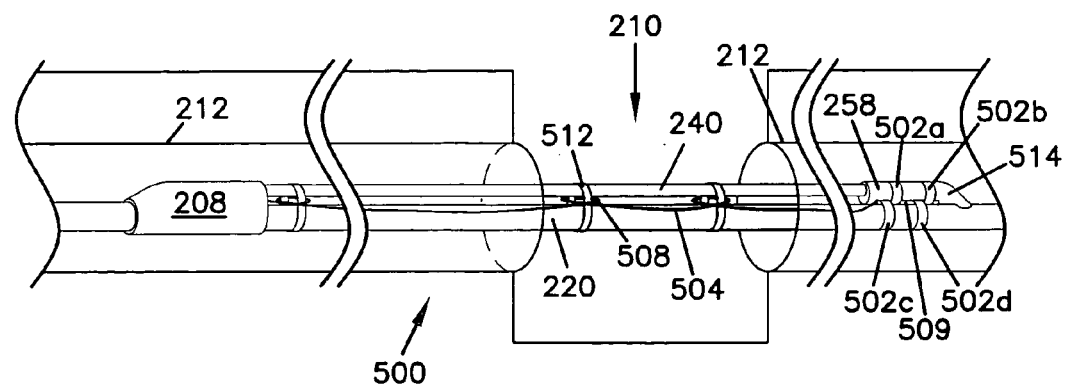
FIG. 22 is a side perspective view of the cable system of FIG. 18 deployed and aligned with a hand-hole location.

Referring now to FIGS. 22 and 23, the tether 240 can be released from the second securement system 500 after deployment of the distribution cable 220. FIG. 22 illustrates a cable system 200 including one example of the second securement system 500 installed in an underground conduit 212. The tether connector body 258 is offset from the hand-hole location 210 in a first direction and the breakout enclosure 208 is offset from the hand-hole 210 in the opposite direction. The hand-hole location 210 provides access to an intermediate portion of the tether cable 240.

The second securement system 500 includes a first retention arrangement (e.g., tape) 512 wrapped around the tether cable 240 and distribution cable 220 at spaced intervals between the enclosure 208 and the connector body 258. A first release device (e.g., a strand of aramid yarn) 504 forms loops 508 around the first retention arrangement 512.

The first release device 504 attaches to a second release device (e.g., a pin) 509. The second release device 509 is attached to the distribution cable 220 and to the tether connector body 258 with a second retention arrangement 502. In the example shown, the pin 509 threads through a first tie-wrap 502c attached to the distribution cable 220, a second tie-wrap 502a attached to the connector body 258, a third tie-wrap 502d attached to the distribution cable 220, and a fourth tie-wrap 502b attached to the connector body 258.

A third retention arrangement (e.g., nose-cone) 514 is also coupled to the distribution cable 220 and to the connector body 258 of the tether 240. The pin 509 threads through an aperture 515 in the nose-cone 514 and couples to the distribution cable 220 with tape 510.

FIG. 23 illustrates an operation flow for a release process 2300 by which the tether can be released from the second securement system. The release process 2300 includes disengaging or unfastening one or more retention arrangements. The process 2300 begins at start module 2302 and proceeds to an access operation 2304. The access operation 2304 opens the hand-hole location to enable a user, such as a field technician, to view the second securement system and tether.

A first release operation 2306 disengages the first retention arrangement. In some embodiments, the first release operation 2306 pulls the first release device to disengage the first retention arrangement. In the example shown in FIG. 22, pulling the flexible strand 504 away from the distribution cable 220 causes the loops 508 of the flexible strand 504 to tighten, thereby cutting the tape 512 wrapped around the tether 240 and the distribution cable 220.

In some embodiments, the securement system 500 includes only the first retention arrangement and the process 2300 proceeds to a connect operation 2312. The connect operation 2312 obtains a sufficient amount of freed tether to optically couple the tether to a drop terminal or other type of telecommunications equipment. For example, the tether connectors 256 can be optically coupled to telecommunications equipment 214 (FIG. 2). The process 2300 ends at stop module 2314 after the connect operation 2312.

In other embodiments, however, the securement system 500 also includes a second retention arrangement and the process 2300 proceeds to a second release operation 2308. The second release operation 2308 disengages the second retention arrangement. In some embodiments, the second release operation 2308 pulls the second release device to disengage the second retention arrangement. In the example shown in FIG. 22, for example, pulling the flexible strand 504 away from the distribution cable 220 causes the pin 509 to pull free from the cable ties 502. In the example shown in FIG. 21, pulling the flexible strand 504 also causes the pin 509 to pull free from the nose cone 514. In a preferred embodiment, the flexible strand 504 is pulled with sufficient force to break the tape 510 securing the pin 509 to the distribution cable 220.

In some embodiments, the securement system 500 includes only the first and second retention arrangements and the process 2300 proceeds to a connect operation 2312 after the second release operation 2308. In other embodiments, however, the securement system 500 includes a third retention arrangement and the process 2300 proceeds to a third release operation 2310.

The third release operation 2310 disengages the third retention arrangement. In some embodiments, the third release operation 2310 pulls the tether to disengage the third retention arrangement. In the example shown in FIG. 22, pulling the tether 240 away from the nose cone 514 disengages the connector body 258 from the nose cone 514. From the third release operation 2310, the process 2300 advances to the connect operation 2312 and proceeds as described above.

The above specification, examples and data provide a complete description of the manufacture and use of the invention. It will be appreciated that the various aspects of the present disclosure provide numerous advantages. For example, securing the tether mitigates the chances of damaging the tether and connectors during installation of the distribution cable. Since many embodiments of the invention can be made without departing from the spirit and scope of the invention, the invention resides in the claims hereinafter appended.

We claim:

1. A securement system comprising:
   a distribution cable including a breakout location protected by an enclosure;
   a tether extending from the enclosure and terminating at a connector body, the tether having a length;
   at least one retention arrangement securing the tether to the distribution cable external to the enclosure; and
   a release device secured to the distribution cable, the release device extending along at least a portion of the length of tether;
   wherein pulling the release device away from the distribution cable disengages the retention arrangement to free the tether from the distribution cable;
   wherein the at least one retention arrangement comprises a first material wrapped around the distribution cable and the tether cable;
   wherein a first portion of the release device extends along the length of the tether between the first material and the tether and wherein a second portion of the release device loops back along an exterior surface of the first material to form a cutting edge portion of the release device.

2. The securement system of claim 1, wherein pulling the second portion of the release device causes the cuffing edge portion to rip the first material along at least a portion of the length of the tether.

3. A securement system comprising:
   a distribution cable including a breakout location protected by an enclosure;
   a tether extending from the enclosure and terminating at a connector body, the tether having a length;
   at least one retention arrangement securing the tether to the distribution cable external to the enclosure; and
   a release device secured to the distribution cable, the release device extending along at least a portion of the length of tether;
   wherein pulling the release device away from the distribution cable disengages the retention arrangement to free the tether from the distribution cable;
   wherein the release device extends generally from the enclosure to the connector body of the tether;
   wherein opposite ends of the release device are secured to the distribution cable adjacent the enclosure, and wherein the cutting edge portion is positioned adjacent the tether connector body.

4. A securement system comprising:
   a distribution cable including a breakout location protected by an enclosure;

a tether extending from the enclosure and terminating at a connector body, the tether having a length;
at least one retention arrangement securing the tether to the distribution cable external to the enclosure; and
a release device secured to the distribution cable, the release device extending along at least a portion of the length of tether;
wherein pulling the release device away from the distribution cable disengages the retention arrangement to free the tether from the distribution cable;
a second retention arrangement;
wherein the at least one retention arrangement comprises a first retention structure;
wherein the second retention arrangement comprises a plurality of loop structures wrapped around the distribution cable at spaced intervals;
wherein the release device is looped around the second retention arrangement, wherein pulling the release device breaks the second retention arrangement.

5. A securement system comprising:
a distribution cable including a breakout location;
a tether extending a length from the distribution cable at the breakout location to at least one connector;
foil wrapped around the distribution cable and the tether to form a foil enclosure, the foil enclosure extending from the breakout location to the at least one connector; and
a wire having a length of about twice the length of the tether cable, the wire including:
a first segment extending within the foil enclosure from a first end coupled to the distribution cable adjacent the breakout location to an intermediate end coupled to the distribution cable adjacent the at least one connector, and
a second segment extending back over at least part of the foil enclosure to a second end of wire, the second end being coupled to the distribution cable and including a ring;
wherein pulling the ring away from the distribution cable cuts the foil staffing at the at least one connector and moving towards the enclosure.

6. A securement system comprising:
a distribution cable including a breakout location;
a tether coupled to the distribution cable at the breakout location, the tether extending a length from the breakout location to a connection end, the connection end including a connector body;
a plurality of strips of tape coupling the tether to the distribution cable at spaced intervals along the distribution cable;
a flexible strand having a first end and a second end, the first end of the flexible strand secured to the distribution cable adjacent the connection end of the tether, the flexible strand being threaded to form a loop around each of the plurality of strips of tape;
a pin coupled to the second end of the flexible strand;
a first series of tie-wraps coupling the pin to the tether; and
a second series of tie-wraps coupling the pin to the distribution cable;
wherein pulling the flexible strand cuts each of the plurality of strips of tape; and
wherein continuing to pull the flexible strand draws the pin out of at least one of the first and second series of tie-wraps to release the tether cable from the distribution cable.

7. A securement system comprising:
a distribution cable including a breakout location protected by an enclosure;
a tether extending from the enclosure and terminating at a connector body, the tether having a length;
at least one retention arrangement securing the tether to the distribution cable; and
a release device secured to the distribution cable, the release device extending along at least a portion of the length of tether;
wherein pulling the release device away from the distribution cable disengages the retention arrangement to free the tether from the distribution cable;
wherein the at least one retention arrangement comprises a first material wrapped around the distribution cable and the tether cable; and
wherein a first portion of the release device extends along the length of the tether between the first material and the tether and wherein a second portion of the release device loops back along an exterior surface of the first material to form a cutting edge portion of the release device.

8. The securement system of claim 7, wherein pulling the second portion of the release device causes the cutting edge portion to rip the first material along at least a portion of the length of the tether.

9. A securement system comprising:
a distribution cable including a breakout location protected by an enclosure;
a tether extending from the enclosure and terminating at a connector body, the tether having a length;
at least one retention arrangement securing the tether to the distribution cable; and
a release device secured to the distribution cable, the release device extending along at least a portion of the length of tether;
wherein pulling the release device away from the distribution cable disengages the retention arrangement to free the tether from the distribution cable;
wherein the release device extends generally from the enclosure to the connector body of the tether; and
wherein opposite ends of the release device are secured to the distribution cable adjacent the enclosure, and wherein the cutting edge portion is positioned adjacent the tether connector body.

10. A securement system comprising:
a distribution cable including a breakout location protected by an enclosure;
a tether extending from the enclosure and terminating at a connector body, the tether having a length;
at least one retention arrangement securing the tether to the distribution cable; and
a release device secured to the distribution cable, the release device extending along at least a portion of the length of tether;
wherein pulling the release device away from the distribution cable disengages the retention arrangement to free the tether from the distribution cable;
wherein the at least one retention arrangement comprises a first retention structure;
wherein the securement system further comprising a second retention arrangement, wherein the second retention arrangement comprises a plurality of loop structures wrapped around the distribution cable at spaced intervals; and
wherein the release device is looped around the second retention arrangement, wherein pulling the release device breaks the second retention arrangement.

* * * * *

UNITED STATES PATENT AND TRADEMARK OFFICE
CERTIFICATE OF CORRECTION

| | | |
|---|---|---|
| PATENT NO. | : 7,480,436 B2 | Page 1 of 1 |
| APPLICATION NO. | : 11/546528 | |
| DATED | : January 20, 2009 | |
| INVENTOR(S) | : Wells et al. | |

It is certified that error appears in the above-identified patent and that said Letters Patent is hereby corrected as shown below:

In the Specification

Col. 6, line 44: "shown in FIG. 1, the" should read --shown in FIG. 11, the--

In the Claims

Col. 10, line 43, claim 2: "causes the cuffing edge" should read --causes the cutting edge--

Signed and Sealed this
Ninth Day of December, 2014

Michelle K. Lee
*Deputy Director of the United States Patent and Trademark Office*